UNITED STATES PATENT OFFICE.

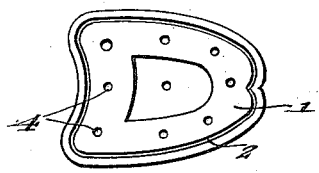
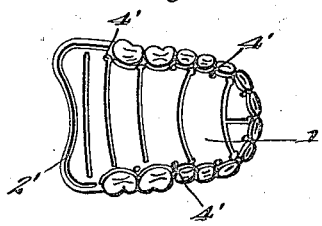
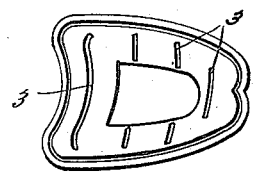
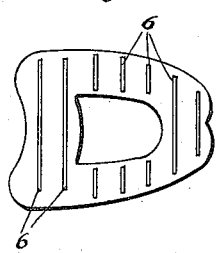

THOMAS W. CAREY, JR., OF NEW ORLEANS, LOUISIANA.

DENTURE RELINER.

1,424,618.  Specification of Letters Patent.  Patented Aug. 1, 1922.

Application filed February 2, 1920. Serial No. 355,841.

*To all whom it may concern:*

Be it known that I, THOMAS W. CAREY, Jr., a citizen of the United States, residing at New Orleans, in the parish of Orleans and State of Louisiana, have invented new and useful Improvements in Denture Reliners, of which the following is a specification.

This invention relates to a method of electro-plating dental and other plates of gutta-percha and the like.

The principal object of the invention is embedded metallic substance in the plate with portions thereof flush with the face of the plate to receive the electro-plating to hold the same to the plate.

Another object of the invention is to provide undercut recesses in the plate to receive the metallic substance so as to prevent the same from being pulled from the plate.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a cross section of a dental plate constructed in accordance with my invention.

Figure 2 is a bottom view of the plate before receiving the metallic substance.

Figure 3 is a like view showing the plate provided with grooves instead of the pits.

Figure 4 is a top view of the plate shown in Figure 3.

Figure 5 is a view showing a plate having strips of wire vulcanized therein when the plate is formed.

In carrying out my invention in connection with old plates, such as shown at 1, in Figures 1, 2 and 3 the plate is first thoroughly cleansed and is then polished. A groove 2 is then formed around the plate adjacent its inner surface or that face which is opposite the face which carries the teeth. This groove may be formed with a wheel bur of a dental machine. This groove is formed with undercut walls and then other grooves, such as shown at 4, in Figure 3 are cut in both faces of the plate and extend across the same. These grooves are also provided with undercut walls. However, instead of the grooves 3 I may form small undercut recesses 4, see Figure 2, in both faces of the plate. Some of these recesses are located adjacent the teeth as shown at 4', Figure 3. These recesses or pits may be used with the grooves as shown in Figure 3 where the pits are shown as arranged adjacent the teeth with the grooves extending to the pits. A marginal groove 2' is formed on the tooth side of the plate where the teeth are omitted.

The grooves and pits are then filled with an amalgam alloy or other metallic substance, as shown at 5, the surface of this alloy being flush with the face of the plate. When the alloy is hardened the plate is given a coating of fine graphite powder.

The plate is then carefully placed in an electro-plating bath and the plate electroplated in the usual manner.

When the electro-plating is of sufficient thickness the plate is removed from the bath and polished and finished in the ordinary manner.

Figure 5 shows a plate in which metallic bodies as shown at 6 are vulcanized into the plate when the plate is formed. These bodies may be formed of strips of wire or metallic studs or the like, these bodies supporting the electro-plating in the usual manner.

It will thus be seen that I provide a plate of rubber or like material having a thin coating of metal. Thus the plate is much lighter than a plate made entirely of metal and is less expensive. The rubber is insulated from the soft tissues of the mouth by the metallic plate thus preventing the ingredients from the rubber from injuring the mouth. It has been found that the composition plate as now used will often cause irritation and inflammation of the mouth, usually caused by the coloring material in the plate. My metallic coating also keeps the plate from becoming sour and germ laden as the metallic coated plate is much easier to keep clean than the composition plate. The teeth loosened from shrinkage can also be rebushed and made to fit tightly without the necessity of remaking the set. My plate will function the same as the more expensive gold cast or swaged plate.

The coating may be formed of any desired metal such as gold, platinum and the like. While I have described the invention as used for dental plates it will of course be understood that any non-metallic plate may be treated by my method.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A dental plate formed of a non-metallic substance having a groove formed therearound adjacent its inner surface, said groove formed with undercut walls and undercut recesses formed in both faces of said plate, said plates on the toothed side have a marginal groove formed therein, metallic pieces located in said recesses and having their outer faces flushed with the surface of the plate and a coating of electro-plating covering said surface.

In testimony whereof I affix my signature.

THOMAS W. CAREY, Jr.